(12) United States Patent
Peraka et al.

(10) Patent No.: US 11,557,890 B2
(45) Date of Patent: Jan. 17, 2023

(54) INSTALLATION OF PRE-DUCTED OPTICAL FIBER CABLE ASSEMBLY

(71) Applicant: Sterlite Technologies Limited, Aurangabad (IN)

(72) Inventors: Sravan Kumar Peraka, Aurangabad (IN); Pavan Kumar Moturu, Aurangabad (IN); Kishore Sahoo, Aurangabad (IN); Prassana Pardeshi, Aurangabad (IN); Santosh Akundi, Aurangabad (IN); Vikash Shukla, Aurangabad (IN)

(73) Assignee: Sterlite Technologies Limited, Aurangabad (IN)

( * ) Notice: Subject to any disclaimer, the term of this patent is extended or adjusted under 35 U.S.C. 154(b) by 0 days.

(21) Appl. No.: 15/942,244

(22) Filed: Mar. 30, 2018

(65) Prior Publication Data

US 2019/0229513 A1 Jul. 25, 2019

(30) Foreign Application Priority Data

Jan. 23, 2018 (IN) .............................. 201811002580

(51) Int. Cl.
| | |
|---|---|
| *G02B 6/44* | (2006.01) |
| *H02G 9/02* | (2006.01) |
| *H02G 3/04* | (2006.01) |
| *H02G 1/08* | (2006.01) |

(52) U.S. Cl.
CPC ............ *H02G 9/025* (2013.01); *G02B 6/441* (2013.01); *H02G 1/08* (2013.01); *H02G 1/081* (2013.01); *H02G 3/0462* (2013.01); *H02G 9/02* (2013.01)

(58) Field of Classification Search
CPC .. E21B 10/26; E21B 7/28; H02G 1/06; H02G 1/081; H02G 9/06; H02G 3/0462; H02G 1/08; H02G 9/025; G02B 6/441; G02B 6/443
USPC .......... 405/154.1, 156, 174, 184; 175/53, 62
See application file for complete search history.

(56) References Cited

U.S. PATENT DOCUMENTS

| 6,870,995 B2 * | 3/2005 | Johnson ............... G02B 6/4403 |
| | | 385/109 |
| 2002/0081083 A1 * | 6/2002 | Griffioen ............... G02B 6/502 |
| | | 385/109 |
| 2005/0034896 A1 * | 2/2005 | Youan ...................... E21B 7/20 |
| | | 175/53 |
| 2012/0219363 A1 * | 8/2012 | Dimitroff ............ F16L 55/1658 |
| | | 405/184.1 |

(Continued)

*Primary Examiner* — Carib A Oquendo
(74) *Attorney, Agent, or Firm* — Steven R. Fairchild; Michael J. Pennington

(57) ABSTRACT

The present disclosure relates to method for underground installation of a pre-ducted optical fiber cable assembly. The method includes a first step of drilling a first pilot bore from a second manhole to a first manhole. In addition, the method includes a second step of pulling the pre-ducted optical fiber cable assembly. Further, the method includes a third step of drilling a second pilot bore from a third manhole to the second manhole. Furthermore, the method includes a fourth step of pulling the pre-ducted optical fiber cable assembly from the second manhole to the third manhole. Moreover, the method of underground installation of the pre-ducted optical fiber cable assembly eliminates the need for blowing the pre-ducted optical fiber cable assembly with a cable blowing machine.

8 Claims, 12 Drawing Sheets

(56) References Cited

U.S. PATENT DOCUMENTS

2017/0343751 A1* 11/2017 Bookbinder ......... G02B 6/4403

* cited by examiner

INSTALLATION OF PRE-DUCTED OPTICAL FIBER CABLE ASSEMBLY

TECHNICAL FIELD

The present disclosure relates to the field of installation of pre-ducted optical fiber cable assembly. More particularly, the present disclosure relates to the pre-ducted optical fiber cable assembly for direct buried application. The present application is based on, and claims priority from an Indian Application Number 201811002580 filed on 23 Jan. 2018 the disclosure of which is hereby incorporated by reference herein.

BACKGROUND

The use and demand for optical fiber cables has grown tremendously in the past few years. One such type of optical fiber cable is micro optical fiber cable. The micro optical fiber cable is used in micro duct applications and is installed in micro ducts. Traditionally, the micro optical fiber cable is laid inside the micro ducts by broadly performing two steps. The two steps involve burying the micro duct inside the ground followed by blowing the cable into the micro duct using a blowing machine. In the conventional methods, two kilometer cable drum is kept at the centre of a track that is at around one kilometer down the track. The duct pieces are laid between the manholes for the entire two kilometer of the track. Generally, one kilometer of cable is pulled from the drum through the duct to a first manhole. Two hundred meter of cable is laid in the duct and the remaining eight hundred is laid on the ground in figure 8 shape. Eight hundred meter of the cable is pulled from the second manhole and twenty meter of coil is stored in manhole one. Two hundred meter of cable is laid in the duct and the remaining six hundred meter is laid on the ground in figure 8 shape. In a similar manner, cable is laid till one kilometer on one side of the track. One kilometer of cable left on the drum is laid on ground in figure 8 shape and the same method is followed again on the other side of the track. The currently available micro optical fiber cable has certain limitations. The existing micro optical fiber cable is installed by performing two different steps. This increases the overall installation time and the cost of installation. There is a need for eliminating the blowing cable step in order to reduce cost and overall time of installation. In addition, there is a need of a solution to install pre-ducted cable assembly using HDD installation. In light of the foregoing discussion, there exists a need for an optical fiber cable assembly which overcomes the above cited drawbacks of conventionally known optical fiber cables.

SUMMARY

In a first example, a method for underground installation of a pre-ducted optical fiber cable assembly is provided. The method includes a first step of drilling a first pilot bore from a second manhole to a first manhole. In addition, the method includes a second step of attaching a second reamer to a first drill string. Moreover, the method includes a third step of attaching the pre-ducted optical fiber cable assembly to a second reamer. Furthermore, the method includes a fourth step of pulling the pre-ducted optical fiber cable that is spooled over a cable drum placed around the first manhole and attached to the first end of the second reamer. Further, the method includes drilling a second pilot bore from a third manhole to the second manhole. Further, the method includes a fifth step of attaching a fourth reamer to the second drill string. Moreover, the method includes a sixth step of attaching the pre-ducted optical fiber cable assembly to the fourth reamer. In addition, the method includes a seventh step of drilling a second pilot bore from a third manhole to the second manhole. Also, the method includes an eighth step of pulling the pre-ducted optical fiber cable assembly installed till a first distance. The pre-ducted optical fiber cable assembly attached to the first end of the fourth reamer is pulled from the second manhole to the third manhole. The second manhole and the first manhole are separated by first distance. The first pilot bore has a first diameter. The first pilot bore is drilled by a first drill string. A first reamer is attached to the first drill string to facilitate the drilling of the first pilot bore. The first drill string is associated with a first horizontal directional drilling machine. The first reamer is detached from the first drill string after completion of the drilling of the first pilot bore. The second reamer is attached at a first end of the first drill string. The pre-ducted optical fiber cable assembly is attached to a first end of the second reamer. The pre-ducted optical fiber cable assembly is pulled from the first manhole to the second manhole. The pre-ducted optical fiber cable assembly is installed for the first distance. The pulling of the pre-ducted optical fiber cable assembly is done by the first horizontal directional drilling machine. The third manhole and the second manhole are separated by a second distance. The second pilot bore has a second diameter. The second pilot bore is drilled by a second drill string. A third reamer is attached to the second drill string to facilitate the drilling of the second pilot bore. The second drill string is associated a second horizontal directional drilling machine. The second horizontal directional drilling machine is placed around the third manhole. The third reamer is detached from the second drill string after completion of the drilling of the second pilot bore. The fourth reamer is attached at a first end of the second drill string. The pre-ducted optical fiber cable assembly is attached to a first end of the fourth reamer. The fourth reamer is attached at a first end of the second drill string. The pre-ducted optical fiber cable assembly is attached to a first end of the fourth reamer. The pulling of the pre-ducted optical fiber cable assembly is done by the second horizontal directional drilling machine.

In a second example, a method for underground installation of a pre-ducted optical fiber cable assembly is provided. The method includes a first step of drilling a first pilot bore from a second manhole to a first manhole. In addition, the method includes a second step of attaching a second reamer to a first drill string. Moreover, the method includes a third step of attaching the pre-ducted optical fiber cable assembly to a second reamer. Furthermore, the method includes a fourth step of pulling the pre-ducted optical fiber cable that is spooled over a cable drum placed around the first manhole and attached to the first end of the second reamer. Further, the method includes drilling a second pilot bore from a third manhole to the second manhole. Further, the method includes a fifth step of attaching a fourth reamer to the second drill string. Moreover, the method includes a sixth step of attaching the pre-ducted optical fiber cable assembly to the fourth reamer. In addition, the method includes a seventh step of drilling a second pilot bore from a third manhole to the second manhole. Also, the method includes an eighth step of pulling the pre-ducted optical fiber cable assembly installed till a first distance. The pre-ducted optical fiber cable assembly attached to the first end of the fourth reamer is pulled from the second manhole to the third manhole. The second manhole and the first manhole are separated by first distance. The first pilot bore has a first diameter. The first pilot bore is drilled by a first drill string. A first reamer is attached to the first drill string to facilitate the drilling of the first pilot bore. The first drill string is associated with a first horizontal directional drilling machine. The second reamer is used to expand diameter of the first pilot bore from the first diameter to a third diameter. The first diameter of the first pilot bore is in a range of about 80 millimeters-100 millimeters. The third diameter of the first pilot bore is in a range of about 120 millimeters-150 millimeters. The first reamer is detached from the first drill string after completion of the drilling of the first pilot bore. The second reamer is attached at a first end of the first drill string. The pre-ducted optical fiber cable assembly is attached to a first end of the second reamer. The pre-ducted optical fiber cable assembly is pulled from the first manhole to the second manhole. The pre-ducted optical fiber cable assembly is installed for the first distance. The pulling of the pre-ducted optical fiber cable assembly is done by the first horizontal directional drilling machine. The third manhole and the second manhole are separated by a second distance. The second pilot bore has a second diameter. The second pilot bore is drilled by a second drill string. A third reamer is attached to the second drill string to facilitate the drilling of the second pilot bore. The second drill string is associated a second horizontal directional drilling machine. The second horizontal directional drilling machine is placed around the third manhole. The third reamer is detached from the second drill string after completion of the drilling of the second pilot bore. The fourth reamer is attached at a first end of the second drill string. The pre-ducted optical fiber cable assembly is attached to a first end of the fourth reamer. The fourth reamer is attached at a first end of the second drill string. The pre-ducted optical fiber cable assembly is attached to a first end of the fourth reamer. The pulling of the pre-ducted optical fiber cable assembly is done by the second horizontal directional drilling machine. The fourth reamer is used to expand a diameter of the second pilot bore from the second diameter to a fourth diameter. The second diameter of the second pilot bore is in a range of about 80 millimeters-100 millimeters. The fourth diameter of the second pilot bore is in a range of about 120 millimeters-150 millimeters.

In a third example, a method for underground installation of a pre-ducted optical fiber cable assembly is provided. The method includes a first step of drilling a first pilot bore from a second manhole to a first manhole. In addition, the method includes a second step of attaching a second reamer to a first drill string. Moreover, the method includes a third step of attaching the pre-ducted optical fiber cable assembly to a second reamer. Furthermore, the method includes a fourth step of pulling the pre-ducted optical fiber cable that is spooled over a cable drum placed around the first manhole and attached to the first end of the second reamer. Further, the method includes drilling a second pilot bore from a third manhole to the second manhole. Further, the method includes a fifth step of attaching a fourth reamer to the second drill string. Moreover, the method includes a sixth step of attaching the pre-ducted optical fiber cable assembly to the fourth reamer. In addition, the method includes a seventh step of drilling a second pilot bore from a third manhole to the second manhole. Also, the method includes an eighth step of pulling the pre-ducted optical fiber cable assembly installed till a first distance. The pre-ducted optical fiber cable assembly attached to the first end of the fourth reamer is pulled from the second manhole to the third manhole. The second manhole and the first manhole are separated by first distance. The first pilot bore has a first diameter. The first pilot bore is drilled by a first drill string. A first reamer is attached to the first drill string to facilitate the drilling of the first pilot bore. The first drill string is associated with a first horizontal directional drilling machine. The second reamer is used to expand diameter of the first pilot bore from the first diameter to a third diameter. The first diameter of the first pilot bore is in a range of about 80 millimeters-100 millimeters. The third diameter of the first pilot bore is in a range of about 120 millimeters-150 millimeters. The first pilot bore has a depth (D1) in a range of about 1.5 meters-5 meters. The first reamer is detached from the first drill string after completion of the drilling of the first pilot bore. The second reamer is attached at a first end of the first drill string. The pre-ducted optical fiber cable assembly is attached to a first end of the second reamer. The pre-ducted optical fiber cable assembly is pulled from the first manhole to the second manhole. The pre-ducted optical fiber cable assembly is installed for the first distance. The pulling of the pre-ducted optical fiber cable assembly is done by the first horizontal directional drilling machine. The third manhole and the second manhole are separated by a second distance. The second pilot bore has a second diameter. The second pilot bore is drilled by a second drill string. A third reamer is attached to the second drill string to facilitate the drilling of the second pilot bore. The second drill string is associated a second horizontal directional drilling machine. The second horizontal directional drilling machine is placed around the third manhole. The third reamer is detached from the second drill string after completion of the drilling of the second pilot bore. The fourth reamer is attached at a first end of the second drill string. The pre-ducted optical fiber cable assembly is attached to a first end of the fourth reamer. The fourth reamer is attached at a first end of the second drill string. The pre-ducted optical fiber cable assembly is attached to a first end of the fourth reamer. The pulling of the pre-ducted optical fiber cable assembly is done by the second horizontal directional drilling machine. The fourth reamer is used to expand a diameter of the second pilot bore from the second diameter to a fourth diameter. The second diameter of the second pilot bore is in a range of about 80 millimeters-100 millimeters. The fourth diameter of the second pilot bore is in a range of about 120 millimeters-150 millimeters. The second pilot bore has a depth (D2) in a range of about 1.5 meters-5 meters. The first pilot bore and the second pilot bore have a fill factor in a range of about 0.015-0.25. The pre-ducted optical fiber cable assembly comprises a duct. The duct is made of high density polyethylene material. The high density polyethylene material has a hardness of 60 shore D. The high density polyethylene material has a notched izod impact strength of 300 J/m at a temperature of 23 degree Celsius. The duct has a thickness in a range of about 2 millimeters-4 millimeters.

BRIEF DESCRIPTION OF FIGURES

Figure 2A:
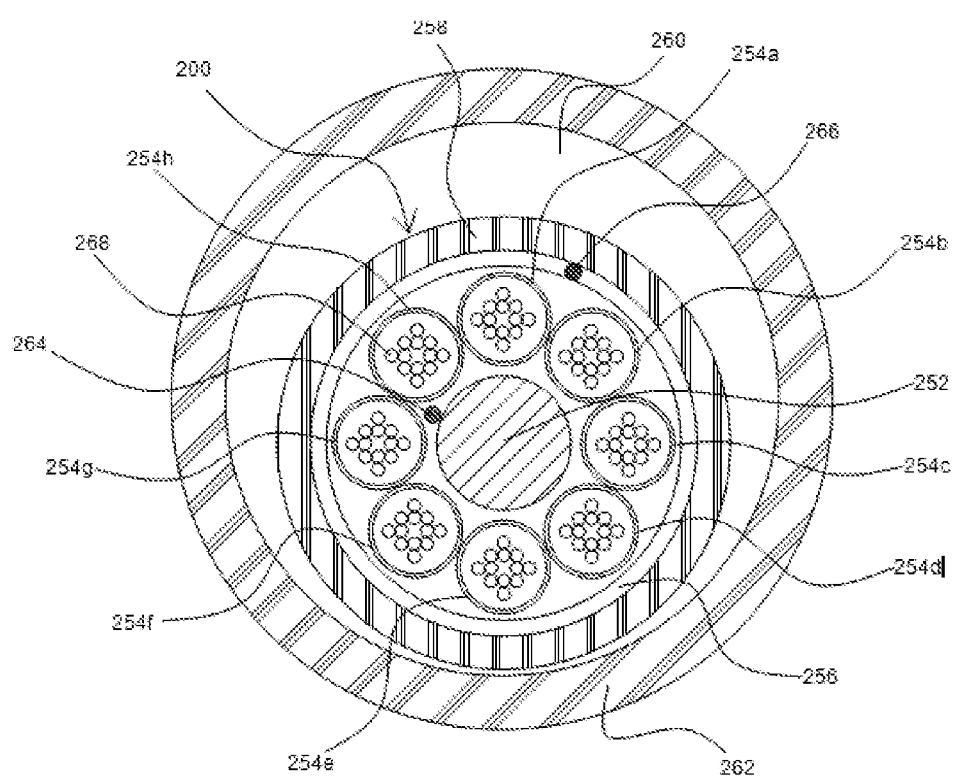
Figure 2B:
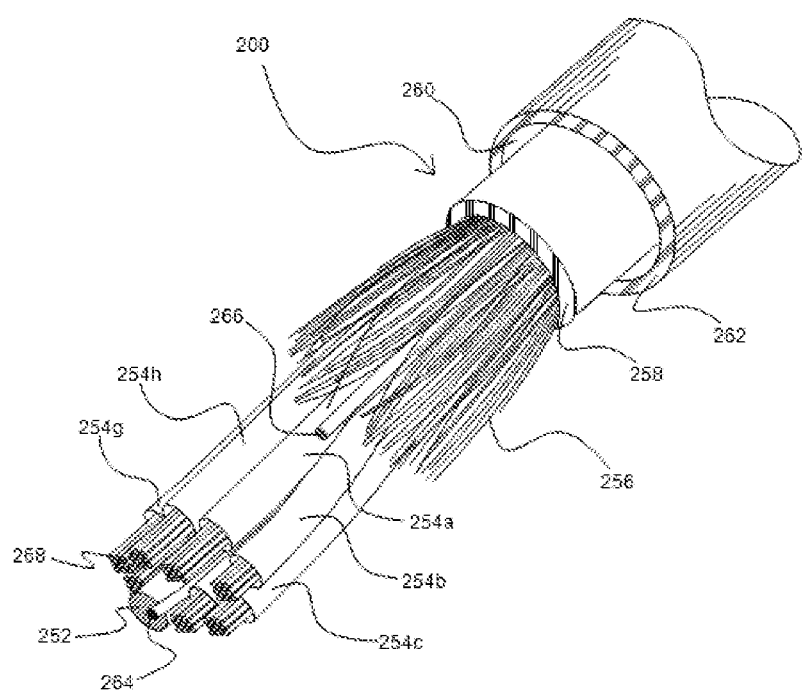
Figure 2C:
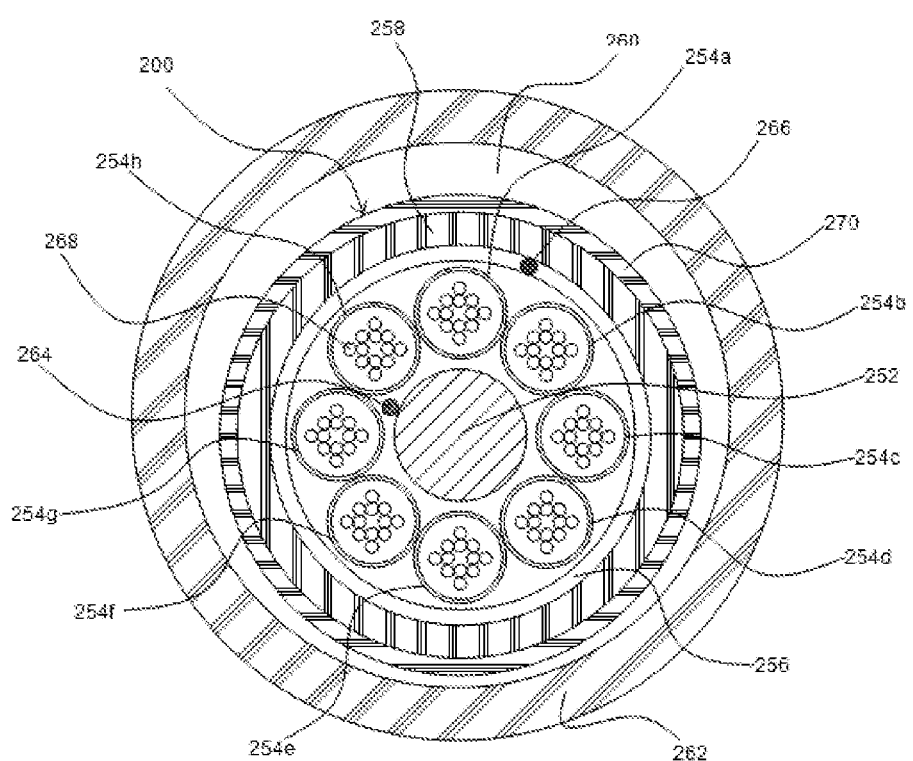
Figure 2D:
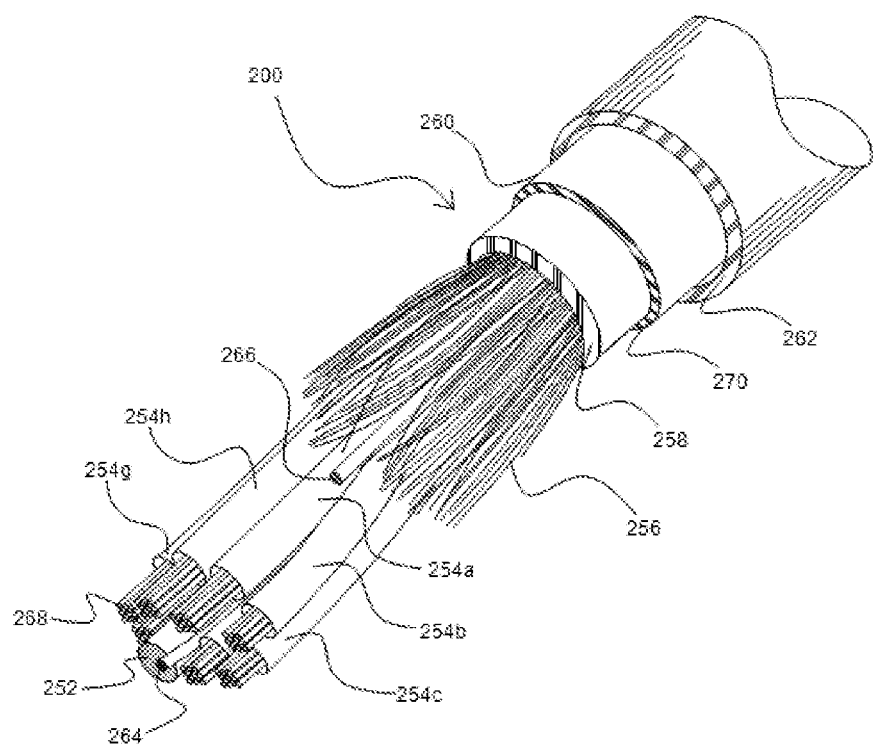
Figure 3A:
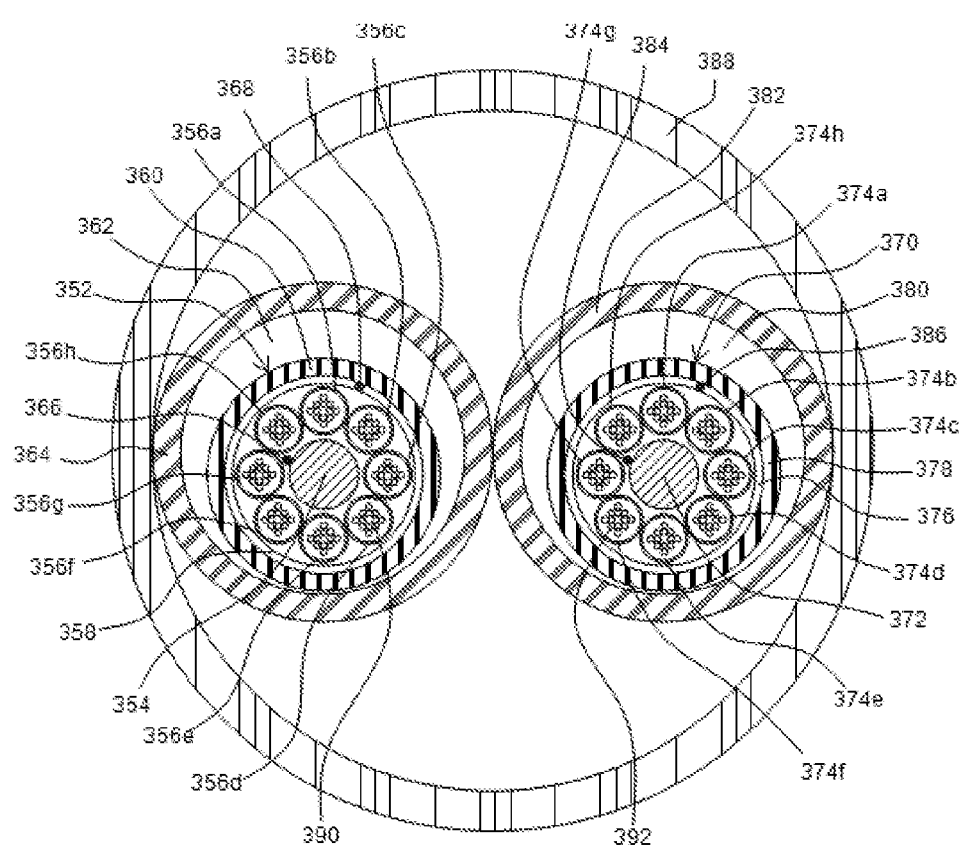
Figure 3B:
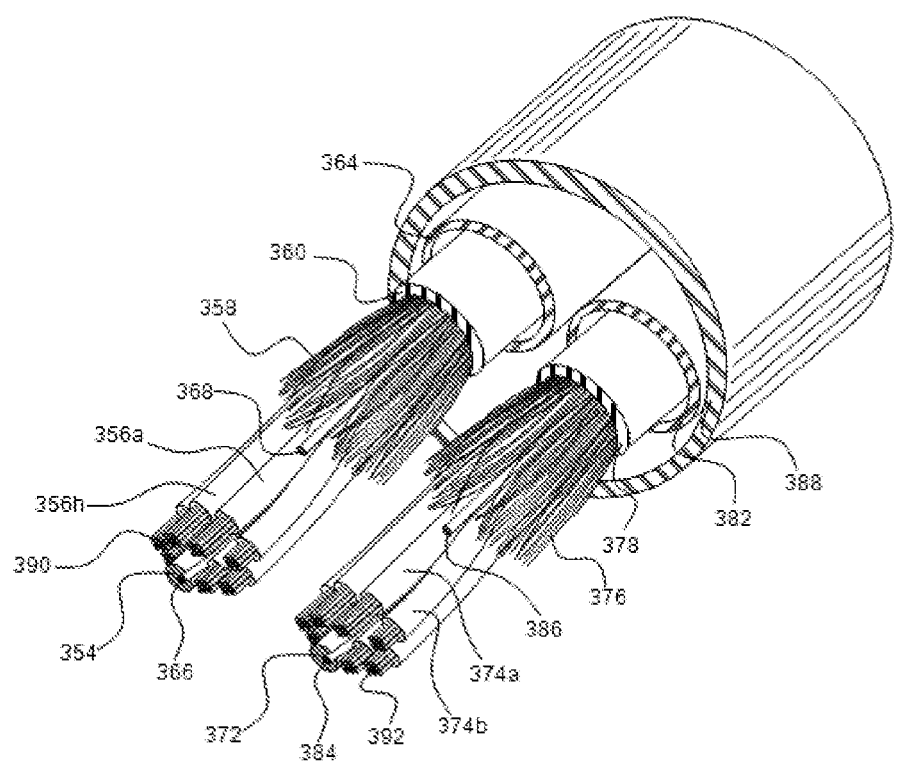
Figure 3C:
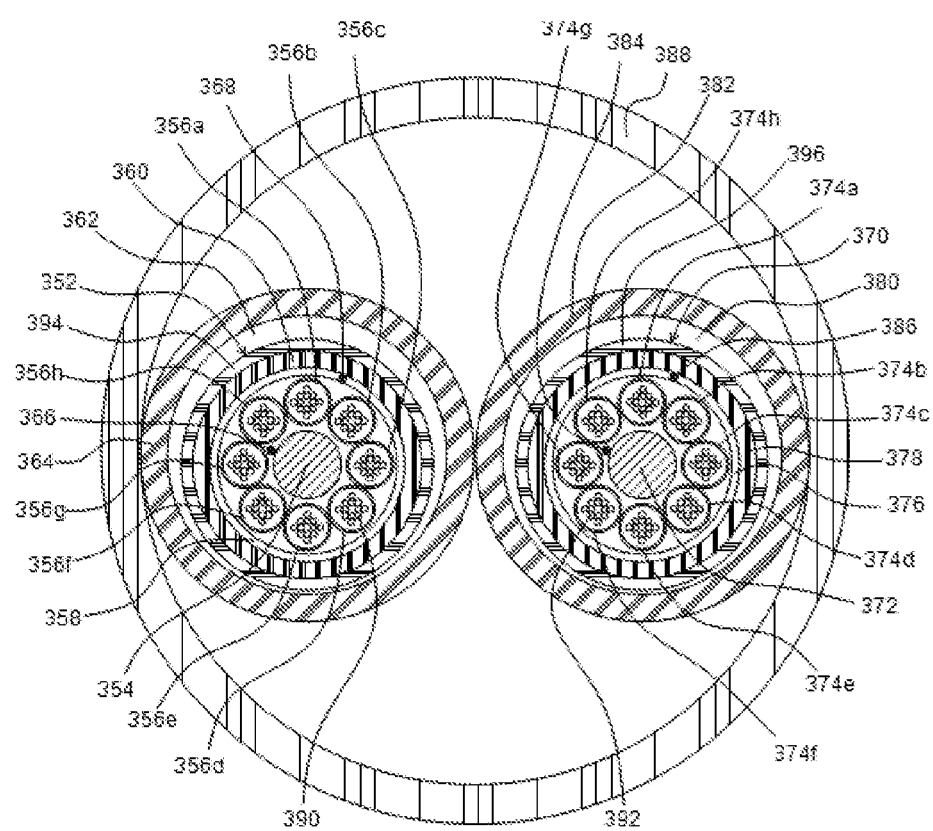
Figure 3D:
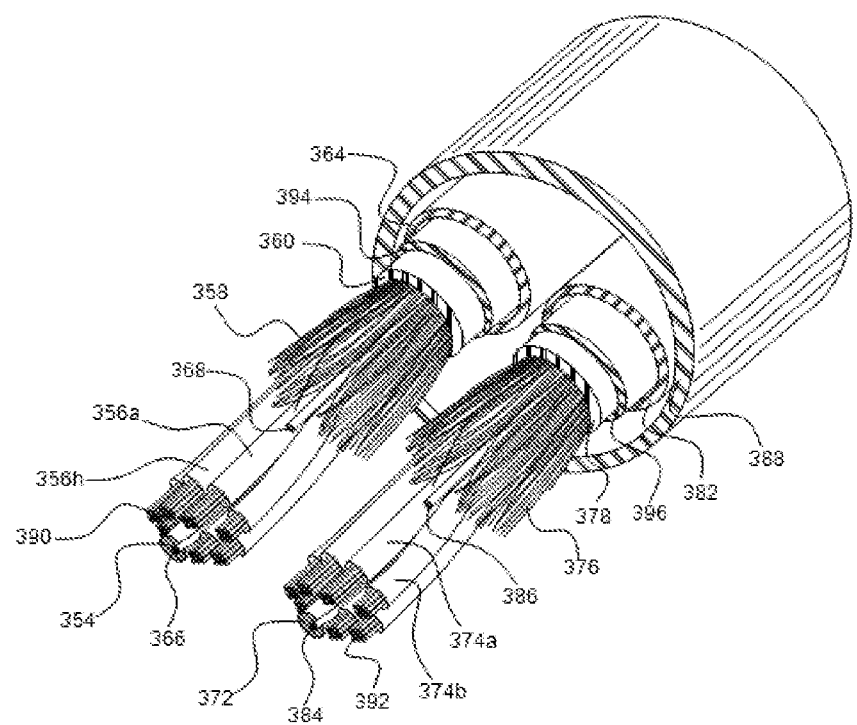

Having thus described the disclosure in general terms, reference will now be made to the accompanying figures, wherein:

FIG. 1A, FIG. 1B, FIG. 1C and FIG. 1D illustrate a diagram for showing an underground installation of pre-ducted optical fiber cable assembly, in accordance with an embodiment of present disclosure;

FIG. 2A illustrates a cross sectional view of the pre-ducted optical fiber cable assembly, in accordance with an embodiment of the present disclosure;

FIG. 2B illustrates a perspective view of the pre-ducted optical fiber cable assembly of FIG. 2A, in accordance with an embodiment of the present disclosure;

FIG. 2C illustrates a cross-sectional view of the pre-ducted optical fiber cable assembly, in accordance with another embodiment of the present disclosure;

FIG. 2D illustrates a perspective view of the pre-ducted optical fiber cable assembly of FIG. 2C, in accordance with another embodiment of the present disclosure;

FIG. 3A illustrates a cross-sectional view of an arrangement of grouped optical fiber cable assemblies, in accordance with yet another embodiment of the present disclosure;

FIG. 3B illustrates a perspective view of the arrangement of FIG. 3A, in accordance with yet another embodiment of the present disclosure;

FIG. 3C illustrates a cross-sectional view of an arrangement of grouped optical fiber cable assemblies, in accordance with yet another embodiment of the present disclosure; and FIG. 3D illustrates a perspective view of the arrangement of FIG. 3C, in accordance with yet another embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifications for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1A:
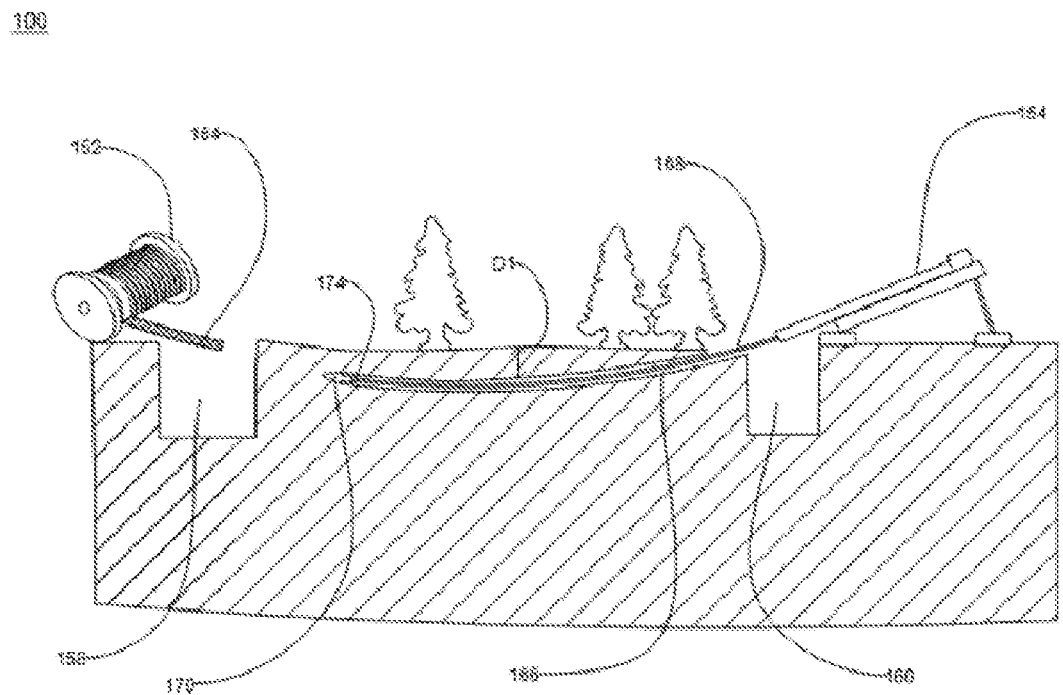
Figure 1B:
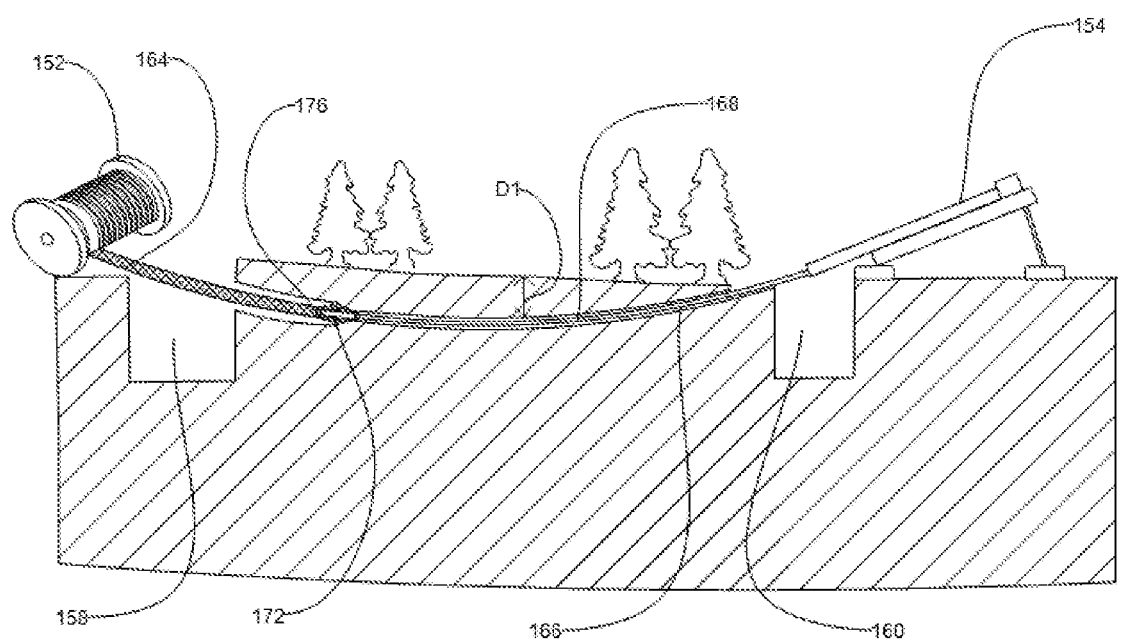
Figure 1C:
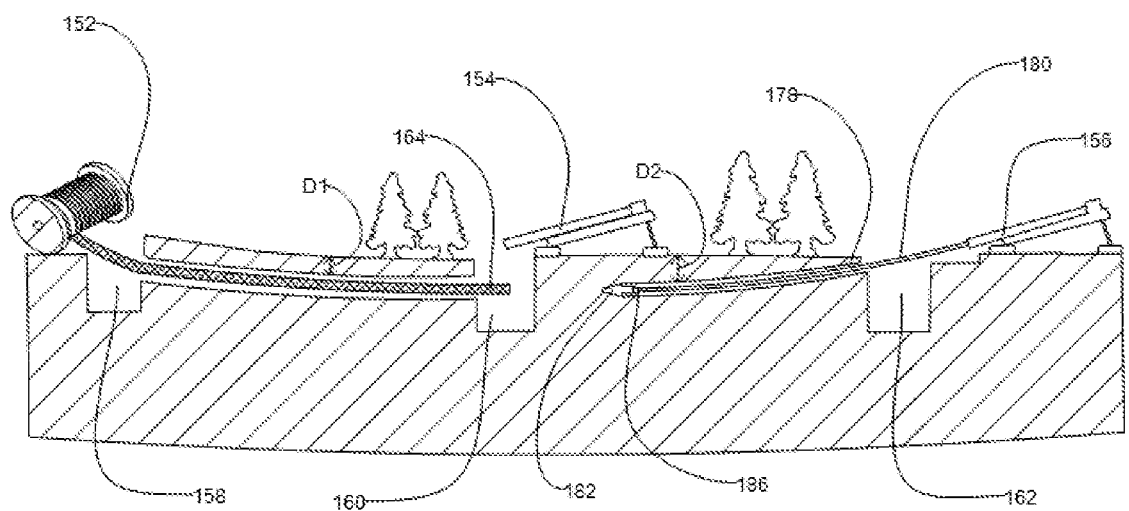
Figure 1D:
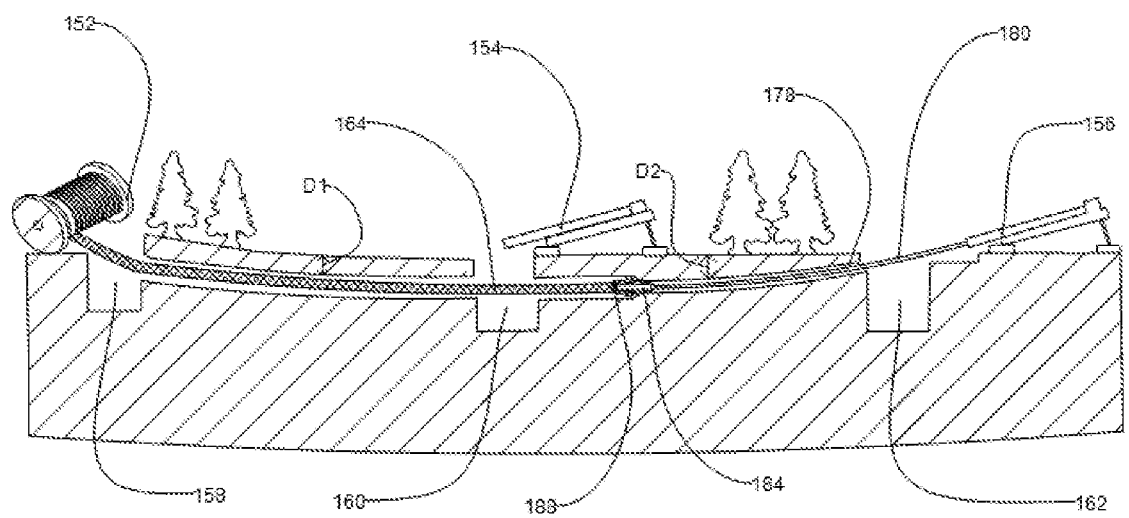

FIG. 1A and FIG. 1B illustrate a diagram 100 for showing an underground installation of a pre-ducted optical fiber cable assembly, in accordance with an embodiment of present disclosure. The diagram 100 is shown for explanation of a method of installing the pre-ducted optical fiber cable assembly 164 inside ground. The pre-ducted optical fiber cable assembly 164 is installed for the underground applications in urban and rural areas without disrupting activities taking place in the area. The method utilizes one or more horizontal direct drilling machines for installing the pre-ducted optical fiber cable assembly 164 underground. In an embodiment of the present disclosure, the method is used for installing the pre-ducted optical fiber cable assembly 164 for at least 2 kilometers. In another embodiment of the present disclosure, the method may be used for installing the pre-ducted optical fiber cable assembly 164 for any suitable length. Generally, a duct may be defined as a tube or passageway. A pre-ducted optical fiber cable may be defined as a cable with pre-installed duct around the cable. This leads to easy installation of the cable.

The diagram 100 of FIG. 1A includes a cable drum 152, a first horizontal directional drilling machine 154, a first manhole 158, a second manhole 160, a pre-ducted optical fiber cable assembly 164, a first pilot bore 166, a first drill string 168 and a first reamer 170. Moreover, the diagram 100 of FIG. 1B includes the cable drum 152, the first horizontal directional drilling machine 154, the first manhole 158, the second manhole 160, the pre-ducted optical fiber cable assembly 164, the first pilot bore 166, the first drill string 168 and a second reamer 172. In addition, the diagram 100 of FIG. 1C includes the cable drum 152, the first horizontal directional drilling machine 154, the first manhole 158, the second manhole 160, a third manhole 162, the pre-ducted optical fiber cable assembly 164, a second horizontal directional drilling machine 156, a second pilot bore 178, a second drill string 180 and a third reamer 182. Further, the diagram 100 of FIG. 1D includes the cable drum 152, the first horizontal directional drilling machine 154, the first manhole 158, the second manhole 160, the third manhole 162, the pre-ducted optical fiber cable assembly 164, the second horizontal directional drilling machine 156, the second pilot bore 178, the second drill string 180 and a fourth reamer 184.

The cable drum 152 includes the pre-ducted optical fiber cable assembly 164 that is spooled over the cable drum 152. Generally, the cable drum is a reel upon which the cable is spooled for transportation purposes. In an embodiment of the present disclosure, the cable drum 152 is made of suitable material. In an example, the suitable material includes wood, plywood, steel, plastic and the like. The cable drum 152 is positioned around the first manhole 158. The second manhole 160 and the first manhole 158 are separated by first distance. Generally, a manhole is a big hole in any path covered by a lid to allow the worker to reach underground and carry out the work. In an embodiment of the present disclosure, the first distance is in a range of about 50 meters-200 meters. The second manhole 160 and the third manhole 162 are separated by a second distance. In an embodiment of the present disclosure, the second distance is in a range of about 50 meters-200 meters. This range is selected based on the soil type and the length of the drilling that can be achieved by the machine. Further, the second manhole 160 is at a distance of 200 meters from the third manhole 162.

In an embodiment of the present disclosure, the plurality of pilot bores includes the first pilot bore 166 and the second pilot bore 178. Generally, a pilot bore is the initial hole drilled during any drilling sequence and spans the entire length of the hole. Generally, drilling is a cutting process that uses a drill to cut a hole of a predefined cross section. Moreover, the first pilot bore 166 is drilled from the second manhole 160 to the first manhole 158. The first pilot bore 166 has a first diameter. In an embodiment of the present disclosure, the first diameter of the first pilot bore 166 is around 80 millimeters. Further, the second pilot bore 178 is drilled from the third manhole 162 to the second manhole 160. The second pilot bore 178 has a second diameter. In an embodiment of the present disclosure, the second diameter of the second pilot bore 178 is around 80 millimeters. Each of the plurality of pilot holes is horizontally drilled and continues underground across the manholes 158-162. Moreover, the plurality of pilot bores is drilled using the one or more horizontal directional drilling machines 154-156. In an embodiment to the present disclosure, the first pilot bore 166 and the second pilot bore 178 has a fill factor in a range of about 0.015-0.25. The range of fill factor is selected to optimize the frictional forces and to prevent any kind of damage that may be caused to the mobilite while pulling it for more than 200 meter. The fill factor of the first pilot bore 166 is defined as ratio of cross sectional area of bore (the first pilot bore 166) to the cross sectional area of the pre-ducted optical fiber cable assembly 164. Similarly, the fill factor of the second pilot bore 178 is defined as ratio of cross sectional area of bore (the second pilot bore 178) to the cross sectional area of the pre-ducted optical fiber cable assembly 164. In an embodiment of the present disclosure, the first pilot bore 166 is characterized by depth D1 and the second pilot bore 178 is characterized by depth D2. In an embodiment of the present disclosure, the first pilot bore 166 has a depth D1 in a range of about 1.5 meters-5 meters. In an embodiment of the present disclosure, the second pilot bore 178 has a depth D2 in a range of about 1.5 meters-5 meters. The above mentioned range is achieved by using HDD machine.

In addition, the one or more horizontal directional drilling machines 154-156 are direct drilling machines used for underground installation of any suitable cable assembly. In an embodiment of the present disclosure, the one or more horizontal directional drilling machines 154-156 are used for underground installation of pre-ducted optical fiber cable assembly 164. Moreover, the one or more horizontal directional drilling machine 154-156 includes the first horizontal directional drilling machine 154 and the second horizontal directional drilling machine 156. Further, the first horizontal directional drilling machine 154 include a plurality of components. Furthermore, the plurality of components includes a first plurality of drill pipes, the first reamer 170 and the like. Each of the first plurality of drill pipes is attached to each other from end to end. Moreover, the first plurality of drill pipes are connected together to form the first drill string 168. The first drill sting 168 is used for drilling inside the ground from one point to another. Also, the second horizontal directional drilling machine 156 includes a plurality of components. Further, the plurality of components includes a second plurality of drill pipes, the third reamer 182 and the like. Each of the second plurality of drill pipes is attached to each other from end to end. Furthermore, the second plurality of drill pipes are connected together to form the second drill string 180. Moreover, the first plurality of drill pipes and the second plurality of drill pipes have male threading on one side and female threading on the other side. In an embodiment of the present disclosure, each of the first plurality of drill pipes and second plurality of drill pipes is a hollow pipe made from heat-treated-high-carbon steel. In an embodiment of the present disclosure, the first drill string 168 and the second drill string 180 utilize a drilling fluid to drill the first pilot bore 166 and the second pilot bore 178. The drilling fluid is water. The drilling fluid is used while drilling the bores to provide wet surface to make drilling easy. Generally, a reamer is a tool for widening the cross section of the already drilled hole with a predefined dimension with a predefined accuracy.

The first reamer 170 is attached to the first drill string 168 to facilitate the drilling of the first pilot bore 166. The first reamer 170 is attached at a first end 174 of the first drill string 168. The first reamer 170 is detached from the first end 174 of the first drill string 168 after completion of the drilling of the first pilot bore 166. The first reamer 170 is a reamer with a small diameter or size. In an embodiment of the present disclosure, the first pilot bore 166 is drilled across the second manhole 160 to the first manhole 158. The second manhole 160 acts as an entry point for the first drill sting 168 and the first manhole 158 acts as an exit point for the first drill string 168. The first pilot bore 166 drilling starts from the second manhole 160 and continues underground to the first manhole 158. The first pilot bore 166 is drilled by the first drill string 168. Further, the first drill string 168 is associated with the first horizontal directional drilling machine 154.

Further, the second reamer 172 is attached to the first drill string 168. The second reamer 172 is attached at the first end 174 of the first drill string 168. The second reamer 172 has a larger diameter than the first reamer 170. Further, the second reamer 172 is used for enlarging the first pilot bore 166. In an embodiment of the present disclosure, the second reamer 172 is used to expand diameter of the first pilot bore 166 from the first diameter to a third diameter. The first diameter of the first pilot bore 166 is in a range of about 80 millimeters-100 millimeters. The third diameter of the first pilot bore 166 is in a range of about 120 millimeters-150 millimeters. Further, the pre-ducted optical fiber cable assembly 164 is attached to the second reamer 172. The pre-ducted optical fiber cable assembly 164 is attached to a first end 176 of the second reamer 172. Accordingly, the pre-ducted optical fiber cable assembly 164 attached to the first end 176 of the second reamer 172 is pulled by the first horizontal directional drilling machine 154. Furthermore, the pulling of the pre-ducted optical fiber cable assembly 164 starts from the second manhole 160 by the first horizontal directional drilling machine 154. The pre-ducted optical fiber cable assembly 164 is installed for the first distance between the first manhole 158 and the second manhole 160. In an embodiment of the present disclosure, the pre-ducted optical fiber cable assembly 164 is installed for a distance of about 200 meters. In an embodiment of the present disclosure, one kilometer of pre-ducted cable is pulled wherein the 200 meter of pre-ducted cable is installed below the ground surface and rest of the 800 meter of pre-ducted cable is arranged in the figure 8 shape on the surface of the ground.

The third reamer 182 is attached to the second drill string 180 to facilitate the drilling of the second pilot bore 178. The third reamer 182 is attached at a first end 186 of the second drill string 180. The third reamer 182 is detached from the first end 186 of the second drill string 180 after completion of the drilling of the second pilot bore 178. The third reamer 182 is a reamer with a small diameter or size. In an embodiment of the present disclosure, the third reamer 182 and the first reamer 170 are same. In an embodiment of the present disclosure, the first pilot bore 166 and the second pilot bore 178 are drilled using same reamer (the first reamer 170). The second pilot bore 178 is drilled across the third manhole 162 to the second manhole 160. The third manhole 162 acts as an entry point for the second drill sting 180 and the second manhole 160 acts as an exit point for the second drill string 180. The second pilot bore 178 drilling starts from the third manhole 162 and continues underground to the second manhole 160. The second pilot bore 178 is drilled by the second drill string 180. Further, the second drill string 180 is associated with the second horizontal directional drilling machine 156.

Further, the fourth reamer 184 is attached to the second drill string 180. The fourth reamer 184 is attached at the first end 186 of the second drill string 180. The fourth reamer 184 has a larger diameter than the third reamer 182. In addition, the pre-ducted optical fiber cable assembly 164 is attached to the fourth reamer 184. The pre-ducted optical fiber cable assembly 164 is attached to a first end 188 of the fourth reamer 184. Furthermore, the fourth reamer 184 is used for enlarging the second pilot bore 178. In an embodiment of the present disclosure, the fourth reamer 184 is used to expand a diameter of the second pilot bore 178 from the second diameter to a fourth diameter. The second diameter of the second pilot bore 178 is in a range of about 80 millimeters-100 millimeters. The fourth diameter of the second pilot bore 178 is in a range of about 120 millimeters-150 millimeters. In an embodiment of the present disclosure, the second reamer 172 and the fourth reamer 184 are same. In an embodiment of the present disclosure, the first pilot bore 166 and the second pilot bore 178 are enlarged using the same reamer (the second reamer 172).

Further, the pre-ducted optical fiber cable assembly 164 installed till the first distance and attached to the first end 188 of the fourth reamer 184 is pulled by the second horizontal directional drilling machine 156. Furthermore, the pulling of the pre-ducted optical fiber cable assembly 164 starts from the second manhole 160 by the second horizontal directional drilling machine 156. In an embodiment of the present disclosure, the pre-ducted optical fiber cable assembly 164 is installed for a distance of about 400 meters. In an embodiment of the present disclosure, there may be more number of manholes and the cable assembly may be installed for more distance depending upon need.

In an embodiment of the present disclosure, the first horizontal directional drilling machine 154 and the second horizontal directional drilling machine 156 are same. In another embodiment of the present disclosure, the first horizontal directional drilling machine 154 and the second horizontal directional drilling machine 156 are different.

FIG. 2A illustrates a cross sectional view of a pre-ducted optical fiber cable assembly 164, in accordance with an embodiment of the present disclosure. The pre-ducted optical fiber cable assembly 164 includes an optical fiber cable 200 and a duct 262. The optical fiber cable 200 is a micro optical fiber cable. The micro optical fiber cable is used for installation in third layer. In addition, the optical fiber cable 200 is used for underground installations. Moreover, the optical fiber cable 200 is used for direct buried applications. The optical fiber cable 200 can be directly buried inside the ground without blowing the optical fiber cable 200. In an embodiment of the present disclosure, the optical fiber cable 200 is a 192F micro optical fiber cable. In addition, 192F corresponds to 192 optical fibers.

The optical fiber cable 200 is made of a plurality of layers (mentioned below in the patent application). The plurality of layers encloses one or more buffer tubes. Each of the one or more buffer tubes is a loose buffer tube. Each buffer tube of the one or more buffer tubes encloses a plurality of optical fibers. In an embodiment of the present disclosure, the plurality of optical fibers is loosely held inside the one or more buffer tubes. In an embodiment of the present disclosure, each of the one or more buffer tubes has a small diameter (mentioned below in the provisional patent application).

Going further, the optical fiber cable 200 includes a central strength member 252, one or more buffer tubes 254a-254h, a first layer 256, a second layer 258 (as seen in FIG. 2A in conjunction with the perspective view of the optical fiber cable 200 provided in FIG. 2B). In addition, the optical fiber cable 200 includes one or more water swellable yarns and one or more ripcords. Further, the optical fiber cable 200 is enclosed by a duct 262. The duct 262 allows direct installation of the optical fiber cable 200 without the need of blowing the optical fiber cable 200. The optical fiber cable 200 is used to transmit optical signals (which may carry sensor data or communication data).

Further, the central strength member 252 lies substantially along a longitudinal axis of the optical fiber cable 200. In addition, the central strength member 252 is coated with a layer of polyethylene. In an embodiment of the present disclosure, the central strength member 252 may be coated with any suitable material. In an embodiment of the present disclosure, the central strength member 252 has a circular cross-section. The central strength member 252 is made of a composite material having a polymer matrix. In an embodiment of the present disclosure, the composite material is flexible fiber reinforced plastic. In another embodiment of the present disclosure, the central strength member 252 may not be coated.

The fiber reinforced plastic is a composite material having a polymer matrix reinforced with glass fibers. Examples of the fiber reinforced plastics include glass fibers, carbon fibers, aramid fibers, basalt fibers and the like. In an embodiment of the present disclosure, the central strength member 252 is made of any suitable material. Moreover, the central strength member 252 provides physical strength to the optical fiber cable 200 and resists over bending of the optical fiber cable 200. The central strength member 252 provides tensile strength to the optical fiber cable 200. The tensile strength corresponds to a resistance shown by the optical fiber cable 200 against buckling.

The central strength member 252 is characterized by a diameter measured substantially across the cross section and from the longitudinal axis of the optical fiber cable 200. In an embodiment of the present disclosure, the central strength member 252 has a diameter of about 2.60 millimeters. In another embodiment of the present disclosure, the central strength member 252 has a diameter in a range of 2.60 millimeters±0.05 millimeter. In an embodiment of the present disclosure, the diameter of the central strength member 252 may vary. Also, the central strength member 252 prevents buckling of the optical fiber cable 200. In an embodiment of the present disclosure, the optical fiber cable 200 may not include the central strength member 252.

Further, the optical fiber cable 200 includes the one or more buffer tubes 254a-254h. The one or more buffer tubes 254a-254h is stranded around the central strength member 252 to form a stranded core. In an embodiment of the present disclosure, the central strength member 252 is surrounded by the one or more buffer tubes 254a-254h. In an embodiment of the present disclosure, the one or more buffer tubes 254a-254h is S-Z stranded around the central strength member 252. Each of the one or more buffer tubes 254a-254h is wound around the central strength member 252 in sections with a first direction of winding in an S-shape alternating with the sections with a second direction of winding in a Z-shape. In an embodiment of the present disclosure, the first direction is a clockwise direction and the second direction is an anticlockwise direction. The binding is performed to retain lay length of the stranded plurality of sleeves and uniform stress distribution along length of the optical fiber cable 200. The S-Z fashion of stranding is a form of stranding of the one or more buffer tubes 254a-254h. In addition, the S-Z stranding allows uniform distribution of the stress across all the one or more buffer tubes 254a-254h. The S-Z stranding may have any number of turns between the S-shape and the Z-shape. In an embodiment of the present disclosure, the S-Z stranding may have 4-7 turns between the S-shape and the Z-shape.

The SZ stranding of the one or more buffer tubes 254a-254h is performed in order to maintain a uniform lay length, mid-spanning and achieve higher production speeds and longer lengths of cable as compared to Helical stranding. In general, the lay length is a longitudinal distance along length of the central strength member 252 required for one buffer tube to go all the way around the central strength member 252 to complete one rotation. In another embodiment of the present disclosure, the one or more buffer tubes 254a-254h are helically stranded around the central strength member 252.

The cross section of each of the one or more buffer tubes 254a-254h is circular in shape. In an embodiment of the present disclosure, the cross section of each of the one or more buffer tubes 254a-254h may be of any suitable shape. In an embodiment of the present disclosure, each of the one or more buffer tubes 254a-254h has a uniform structure and dimensions. In an embodiment of the present disclosure, number of the one or more buffer tubes 254a-254h is 8. In another embodiment of the present disclosure, the number of the one or more buffer tubes 254a-254h may vary.

Each of the one or more buffer tubes 254a-254h has a thickness. In an embodiment of the present disclosure, the thickness of each of the one or more buffer tubes 254a-254h is equal. In an embodiment of the present disclosure, the thickness of each of the one or more buffer tubes 254a-254h is about 0.20 millimeter. In another embodiment of the present disclosure, the thickness of each of the one or more buffer tubes 254a-254h is in a range of 0.20 millimeter±0.025 millimeter. In yet another embodiment of the present disclosure, the thickness of each of the one or more buffer tubes 254a-254h may vary.

Furthermore, each of the one or more buffer tubes 254a-254h has an inner diameter and an outer diameter. In an embodiment of the present disclosure, the inner diameter of each of the one or more buffer tubes 254a-254h is about 1.25 millimeters. In another embodiment of the present disclosure, the inner diameter of each of the one or more buffer tubes 254a-254h is in a range of 1.25 millimeters±0.05 millimeter. In yet another embodiment of the present disclosure, the inner diameter of each of the one or more buffer tubes 254a-254h may vary.

In an embodiment of the present disclosure, the outer diameter of each of the one or more buffer tubes 254a-254h is about 1.65 millimeters. In another embodiment of the present disclosure, the outer diameter of each of the one or more buffer tubes 254a-254h is in a range of 1.65 millimeters±0.05 millimeter. In yet another embodiment of the present disclosure, the outer diameter of each of the one or more buffer tubes 254a-254h may vary. Further, each of the one or more buffer tubes 254a-254h is a micro loose tube.

Going further, each of the one or more buffer tubes 254a-254h encloses a plurality of optical fibers 268. In addition, each of the one or more buffer tubes 254a-254h encloses 24 optical fibers. In the present disclosure, each of the one or more buffer tubes 254a-254h may enclose more or less number of optical fibers. In an example, the total number of optical fibers 268 in the optical fiber cable 200 is 288. Each of the one or more buffer tubes 254a-254h is a tube for encapsulating the plurality of optical fibers. The one or more buffer tubes 254a-254h provides support and protection to each of the plurality of optical fibers 268 against crush, bend and stretch. In addition, the one or more buffer tubes 254a-254h protects the plurality of optical fibers 268 and prevents ingression of water inside the stranded core of the optical fiber cable 200.

Further, the one or more buffer tubes 254a-254h provides mechanical isolation, physical damage protection and identification of each of the plurality of optical fibers 268. In an embodiment of the present disclosure, each of the one or more buffer tubes 254a-254h is colored. In an embodiment of the present disclosure, each of the one or more buffer tubes 254a-254h has a different color. In addition, total number of colors available for coloring the buffer tubes is 12. The coloring is done for identification of each of the one or more buffer tubes 254a-254h. The colors include blue, orange, green, brown, gray, white, red, black, yellow, violet, pink and aqua. In an embodiment of the present disclosure, the one or more buffer tubes 254a-254h is made from a material selected from a group. The group consists of polybutylene terephthalate and nylon. In another embodiment of the present disclosure, the one or more buffer tubes 254a-254h may be made of any other suitable material.

In an embodiment of the present disclosure, each of the one or more buffer tubes 254a-254h is filled with a gel. In an embodiment of the present disclosure, the gel is a thixotropic gel. In an embodiment of the present disclosure, the thixotropic gel prevents ingression of water inside each of the one or more buffer tubes 254a-254h. In another embodiment of the present disclosure, the one or more buffer tubes 254a-254h may not be filled with the gel.

Further, each of the plurality of optical fibers 268 is a fiber used for transmitting information as light pulses from one end to another. In addition, each of the plurality of optical fibers 268 is a thin strand of glass capable of transmitting optical signals. Also, each of the plurality of optical fibers 268 is configured to transmit large amounts of information over long distances with relatively low attenuation. Further, each of the plurality of optical fibers 268 includes a core region and a cladding region. The core region is an inner part of an optical fiber and the cladding section is an outer part of the optical fiber. Moreover, the core region is defined by a central longitudinal axis of each of the plurality of optical fibers 268. In addition, the cladding region surrounds the core region.

Each of the plurality of optical fibers 268 has a diameter of about 200 microns. In another embodiment of the present disclosure, each of the plurality of optical fibers 268 has a diameter in a range of 200 microns±5 microns. In yet another embodiment of the present disclosure, the diameter of each of the plurality of optical fibers 268 may vary. In an embodiment of the present disclosure, each of the plurality of optical fibers 268 is a single mode fiber. In another embodiment of the present disclosure, each of the plurality of optical fibers 268 is a multimode fiber.

In an embodiment of the present disclosure, number of the plurality of optical fibers 268 in each of the one or more buffer tubes 254a-254h is 24. In another embodiment of the present disclosure, the number of the plurality of optical fibers 268 in each of the one or more buffer tubes 254a-254h is more or less than 24. In an embodiment of the present disclosure, the number of the plurality of optical fibers 268 in each buffer tube may vary depending upon the cable requirements. Accordingly, a total number of the plurality of optical fibers 268 in the optical fiber cable 200 is 192 (24*8). In an embodiment of the present disclosure, the total number of the plurality of optical fibers 268 may be more or less than 192 depending upon the number of buffer tubes and the optical fibers in each buffer tube.

In an embodiment of the present disclosure, each of the plurality of optical fibers 268 is a colored optical fiber. In an embodiment of the present disclosure, each of the plurality of optical fibers 268 has a different color. In another embodiment of the present disclosure, the total number of colors available for coloring the optical fibers is 12. The coloring is done for identification of each of the plurality of optical fibers 268. The colors include blue, orange, green, brown, gray, white, red, black, yellow, violet, pink and aqua. In an embodiment of the present disclosure, the color repeats when the number of the plurality of optical fibers 268 exceed more than 12. In an embodiment of the present disclosure, a number of optical fibers 268 with same color in each of the one or more buffer tubes 254a-254h are 2.

Going further, the optical fiber cable 200 includes the first layer 256. The first layer 256 surrounds the one or more buffer tubes 254a-254h. The first layer 256 includes one or more yarns. In addition, the first layer acts as a binding element for the one or more buffer tubes 254a-254h. In an embodiment of the present disclosure, each of the one or more yarns is a binder yarn. In an embodiment of the present disclosure, the binder yarn is made of aramid. In another embodiment of the present disclosure, the binder yarn is made of any other suitable material. Each of the one or more yarns is a yarn thread. In an embodiment of the present disclosure, a number of the one or more yarns are 2. In another embodiment of the present disclosure, the number of the one or more yarns may vary.

In an embodiment of the present disclosure, the binder yarn facilitates absorption of water and moisture. In addition, each of the one or more yarns prevents ingression of the water inside the optical fiber cable 200. In addition, the first layer 256 binds the stranded one or more buffer tubes 254a-254h to prevent opening up of the stranded one or more buffer tubes 254a-254h. In an embodiment of the present disclosure, the first layer 256 provides retention of the lay length of the one or more buffer tubes 254a-254h. In an embodiment of the present disclosure, the first layer 256 acts as a strengthening element for the one or more buffer tubes 254a-254h.

Further, the optical fiber cable 200 includes the second layer 258. The second layer 258 surrounds the first layer 256. In an embodiment of the present disclosure, the second layer 258 is made of a material. The material is selected from a group. The group consists of polyamide and polypropylene. The material for the second layer 258 has high melting point than the material of the duct 262. Further, the second layer 258 is an outer jacket of the optical fiber cable 200. Also, the second layer 258 provides protection to the optical fiber cable 200.

The second layer 258 is characterized by a thickness. In an embodiment of the present disclosure, the second layer 258 has a thickness of about 0.45 millimeter. In another embodiment of the present disclosure, the second layer 258 has the thickness in the range of 0.40 millimeter-0.80 millimeter. In yet another embodiment of the present disclosure, the thickness of the second layer 258 may vary. In an embodiment of the present disclosure, the second layer 258 is black in color. In another embodiment of the present disclosure, the second layer 258 may be of any color. In addition, the second layer 258 is a sheathing layer. The second layer 258 protects the optical fiber cable 200 against the crush, the bend and tensile stress along the length of the optical fiber cable 200. In an embodiment of the present disclosure, the second layer 258 is enclosed by an antirodent master batch added during the extrusion process.

Going further, the optical fiber cable 200 includes the one or more water swellable yarns. In an embodiment of the present disclosure, the optical fiber cable 200 includes a water swellable yarn 264. In another embodiment of the present disclosure, number of the water swellable yarns are 5. In yet another embodiment of the present disclosure, the number of the one or more water swellable yarns may vary. Further, the one or more water swellable yarns are positioned over the central strength member 252 and over the stranded core of the optical fiber cable 200. The one or more water swellable yarns prevent ingression of water in the stranded core of the optical fiber cable 200.

Further, the optical fiber cable 200 includes the one or more ripcords. In an embodiment of the present disclosure, the optical fiber cable 200 includes a ripcord 266. In another embodiment of the present disclosure, a number of the one or more ripcords are 1. In yet another embodiment of the present disclosure, the number of the one or more ripcords may vary. In an embodiment of the present disclosure, the one or more ripcords are embedded in the first layer 256. The one or more ripcords lie substantially along the longitudinal axis of the optical fiber cable 200. The one or more ripcords facilitate stripping of the second layer 258.

In an embodiment of the present disclosure, the one or more ripcords are made of a material selected from a group. The material includes a polyester material and aramid fibers material. In another embodiment of the present disclosure, the one or more ripcords are made of any suitable material. In an embodiment of the present disclosure, each of the one or more ripcords has a circular cross-section. Further, the optical fiber cable 200 has a diameter of about 6.80 millimeters. In an embodiment of the present disclosure, the optical fiber cable 200 has the diameter in a range of 6.6 millimeters-7.5 millimeters. In another embodiment of the present disclosure, the diameter of the optical fiber cable 200 may vary. In an embodiment of the present disclosure, the optical fiber cable 200 has a core diameter of about 5.90 millimeters. Moreover, the optical fiber cable 200 has a weight of about 129 kilograms per kilometer. In an embodiment of the present disclosure, the optical fiber cable 200 has a weight in a range of 129 kilograms per kilometer ±5 percent.

Going further, the optical fiber cable 200 is enclosed by the duct 262. The optical fiber cable 200 and the duct 262 are substantially positioned along the longitudinal axis of the optical fiber cable 200. Also, the optical fiber cable 200 and the duct 262 are separated by a first pre-defined separation. The predefined separation is such that fill factor of the optical fiber cable 200 is around 50%. The fill factor is ratio of cross section of cable diameter to cross section of the inner diameter of the duct 262. The first pre-defined separation corresponds to a free space 260.

The duct 262 does not stick with the second layer 258 of the optical fiber cable 200. In addition, the non-sticking of the duct 262 is due to the material from which the second layer 258 is made. Moreover, the temperature of the duct 262 is tightly controlled during manufacturing to ensure that the duct 262 does not stick with the optical fiber cable 200. Further, the duct 262 allows direct installation of the optical fiber cable 200 without the need for blowing the optical fiber cable 200. In addition, the duct 262 is ultraviolet proof.

The duct 262 is characterized by a thickness. In an embodiment of the present disclosure, the thickness of the duct 262 is about 2 millimeters. In another embodiment of the present disclosure, the thickness of the duct 262 is in a range of 2 millimeters-4 millimeters. In yet another embodiment of the present disclosure, the thickness of the duct 262 may vary.

Furthermore, the duct 262 has an inner diameter and an outer diameter. In an embodiment of the present disclosure, the inner diameter of the duct 262 is about 10.8 millimeters. In another embodiment of the present disclosure, the inner diameter of the duct 262 is in a range of 10.60 millimeters-11.5 millimeters. In yet another embodiment of the present disclosure, the inner diameter of the duct 262 may vary. In an embodiment of the present disclosure, the duct 262 is made of high density polyethylene material. In an embodiment of the present disclosure, the high density polyethylene material has a hardness of 60 shore D. The Shore D hardness is a standard test for measuring hardness of material based on depth of penetration of a specific indenter. In an embodiment of the present disclosure, the high density polyethylene material has notched izod impact strength of 300 J/m at a temperature of 23 degree Celsius. The izod impact strength is used for measuring the impact resistance of materials. In addition, the impact strength corresponds to a capability of a material to withstand suddenly applied load. Further, HDPE is used as a duct material due to its good mechanical and environmental properties. Furthermore, HDPE has a hardness of 60 shore D and a notched izod impact strength of 300 J/m at a temperature of 23 degrees Celsius which helps to withstand crush forces and impact forces that may be applied during the installation or over the lifetime of mobilite.

In an embodiment of the present disclosure, the outer diameter of the duct 262 is about 14.8 millimeters. In another embodiment of the present disclosure, the outer diameter of the duct 262 is in a range of 14.4 millimeters-15.5 millimeters. In yet another embodiment of the present disclosure, the outer diameter of the duct 262 may vary. Further, the duct 262 is a micro duct. In an embodiment of the present disclosure, the duct 262 can be applied over any type of cable design. In an embodiment of the present disclosure, the duct 262 can be extruded around any type of optical fiber cable which needs to be blown into a duct.

In an embodiment of the present disclosure, the second layer 258 is enclosed by a fourth layer 270 when the duct 262 is made of at least one of low density polyethylene, medium density polyethylene and high density polyethylene (as shown in FIG. 2C and FIG. 2D). The fourth layer 270 is a thin layer. In an embodiment of the present disclosure, the fourth layer 270 is made of a material selected from a group. The group consists of polyamide or polypropylene. In an embodiment of the present disclosure, the fourth layer 270 has a thickness in a range of 0.3 mm-0.5 mm. In another embodiment of the present disclosure, the optical fiber cable 200 may not include the fourth layer 270. In an embodiment of the present disclosure, the fourth layer 270 is provided to avoid sticking of the second layer 258 made of polyethylene material with the polyethylene duct (the duct 262).

In an embodiment of the present disclosure, the duct 262 is enclosed by an armoring layer for providing additional ruggedness. In addition, the armoring layer is made of a material selected from a group. The group consists of steel tape, aramid yarns, glass yarns, fiber reinforced plastic, steel wire and the like. In an embodiment of the present disclosure, the armoring layer may be made of any other suitable material. In another embodiment of the present disclosure, the third layer may not be enclosed by the armoring layer.

FIG. 3A illustrates a cross-sectional view of an arrangement 300 of grouped optical fiber cable assemblies, in accordance with yet another embodiment of the present disclosure. The arrangement 300 an optical fiber cable 352 and an optical fiber cable 370. The optical fiber cable 352 and the optical fiber cable 370 is similar to the optical fiber cable 200 of FIG. 2A. In an embodiment of the present disclosure, the arrangement 200 is applicable for any type of optical fiber cable design. The optical fiber cable 352 includes a central strength member 354, one or more buffer tubes 356a-356h, a first layer 358 and a second layer 360 (as seen in FIG. 3A in conjunction with the perspective view of the arrangement 300 provided in FIG. 3B). In addition, the optical fiber cable 352 includes a plurality of optical fibers 390. Further, the optical fiber cable 370 includes central strength member 372, one or more buffer tubes 374a-374h, a first layer 376 and a second layer 378. In addition, the optical fiber cable 370 includes a plurality of optical fibers 392.

The optical fiber cable 352 and the optical fiber cable 370 includes one or more water swellable yarns and one or more ripcords. In an embodiment of the present disclosure, the optical fiber cable 352 includes a water swellable yarn 366 and the optical fiber cable 370 includes a water swellable yarn 384. In an embodiment of the present disclosure, the optical fiber cable 352 includes a ripcord 368 and the optical fiber cable 370 includes a ripcord 386. Further, the optical fiber cable 352 is enclosed by a third layer. The third layer is a duct 364. In addition, the optical fiber cable 370 is enclosed by a third layer. The third layer is a duct 382. The third layer 364 and the third layer 382 allows direct installation of the optical fiber cable 352 and the optical fiber cable 370 without the need of blowing the optical fiber cable 352 and the optical fiber cable 370 (as previously mentioned above in the detailed description of the FIG. 2A).

Further, the combination of the optical fiber cable 352 enclosed by the duct 364 and the optical fiber cable 370 enclosed by the duct 382 is enclosed by a fourth layer 388. In an embodiment of the present disclosure, the fourth layer 388 is an additional duct layer. The fourth layer 388 is made of a material selected from a group. The group consists of polyamide, low density polyethylene, medium density polyethylene and high density polyethylene and polypropylene. The fourth layer 388 holds the grouped optical fiber cables with corresponding third layers together. In an embodiment of the present disclosure, the optical fiber cable 352 and the optical fiber cable 370 is jacketed together by the fourth layer 388. In an embodiment of the present disclosure, the fourth layer 388 has a thickness in a range of 1.5mm-2.0 mm.

In an embodiment of the present disclosure, the fourth layer 388 may be used for jacketing multiple combinations of optical fiber cables with corresponding third layers together. In an example, the fourth layer 388 may jacket 3 combinations of the optical fiber cables with corresponding third layers together. In another example, the fourth layer 388 may jacket 4 combinations of the optical fiber cables with corresponding third layers together. In yet another example, the fourth layer 388 may jacket 5 combinations of the optical fiber cables with corresponding third layers together. In an embodiment of the present disclosure, the fourth layer 388 is flat shaped. In another embodiment of the present disclosure, the fourth layer 388 is triangle shaped. In yet another embodiment of the present disclosure, the fourth layer 388 is square shaped. In yet another embodiment of the present disclosure, the fourth layer 388 is hexagonal shaped. In an embodiment of the present disclosure, the shape of the fourth layer 388 is based on a number of the grouped optical fiber cables with corresponding third layers.

In an embodiment of the present disclosure, the duct 364 may not enclose any optical fiber cable and the duct 382 encloses the optical fiber cable 370 to facilitate blowing of a new cable. In another embodiment of the present disclosure, the duct 364 and the duct 382 include pre-installed optical fiber cables. In yet another embodiment of the present disclosure, an optical fiber cable with same fiber capacity or a higher fiber capacity as compared to the optical fiber cable 352 can be blown by de-blowing the existing cable 352.

In an embodiment of the present disclosure, the second layer 360 is enclosed by a fifth layer 344 and the second layer 378 is enclosed by a fifth layer 346 when the duct 364 and the duct 382 are made of at least one of low density polyethylene, medium density polyethylene and high density polyethylene (as shown in FIG. 3C and FIG. 3D). The fifth layer 344 of the optical fiber cable 352 and the fifth layer 346 of the optical fiber cable 370 are similar to the fourth layer 270 of the optical fiber cable 200. The fifth layer 344 and the fifth layer 346 is a thin layer. In an embodiment of the present disclosure, the fifth layer 344 and the fifth layer 346 are made of a material selected from a group. The group consists of polyamide or polypropylene. In an embodiment of the present disclosure, the fifth layer 344 and the fifth layer 346 have a thickness in a range of 0.3 mm-0.5 mm. In another embodiment of the present disclosure, the arrangement 300 may not include the fifth layer 344 and the fifth layer 346. In an embodiment of the present disclosure, the fifth layer 344 and the fifth layer 346 are provided to avoid sticking of the second layer 360 and the second layer 378 made of polyethylene material with the polyethylene duct.

The pre-ducted optical fiber cable installation method disclosed above is significant because it leads to shortening of time for installing the pre-ducted optical fiber cable. By performing the above mentioned method, there is no need to install the duct separately and the method allows cable to be installed using HDD. Further, the fill factor is kept in the range of 0.015-0.25 to optimize the frictional forces and to prevent any kind of damage that may be caused to the mobilite while pulling it for more than 200 meter. Furthermore, HDPE is used as a duct material due to its good mechanical and environmental properties. Furthermore, HDPE has a hardness of 60 shore D and a notched izod impact strength of 300 J/m at a temperature of 23 degrees Celsius which helps to withstand crush forces and impact forces that may be applied during the installation or over the lifetime of mobilite.

The pre-ducted optical fiber cable disclosed above has various advantages over the existing cables of the same kind. The major advantage includes better resistance of the cable from any kind of mechanical stress or force on the cable. The other major advantage includes protection of the cable from the rodents present inside the soil.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A pre-ducted optical fiber cable assembly comprising:
an optical fiber cable including a central strength member; and
a duct enclosing the optical fiber cable such that the optical fiber cable rests on an inner surface of the duct when the pre-ducted optical fiber cable assembly is deployed, wherein an outermost layer of the optical fiber cable and the inner surface of the duct does not stick to each other, wherein longitudinal axes passing through geometrical centers of the duct and the central strength member of the optical fiber cable are parallel and non-coinciding.

2. The pre-ducted optical fiber cable assembly as claimed in claim 1, wherein a fill factor of the pre-ducted optical fiber cable assembly is more than 50%.

3. The pre-ducted optical fiber cable assembly as claimed in claim 1, wherein the optical fiber cable and the duct are not concentric.

4. The pre-ducted optical fiber cable assembly as claimed in claim 1, wherein the duct has an inner diameter and an outer diameter, and wherein the inner diameter of the duct is in a range of 10.60 millimeters-11.5 millimeters and the outer diameter of the duct is in a range of 14.4 millimeters-15.5 millimeters.

5. The pre-ducted optical fiber cable assembly as claimed in claim 1, wherein the duct is made of high density polyethylene material.

6. The pre-ducted optical fiber cable assembly as claimed in claim 1, wherein the duct has at least one of:
a hardness of 60 shore D;
a notched izod impact strength of 300 J/m at a temperature of 23 degree Celsius; and
a thickness in a range of 2 millimeters-4 millimeters.

7. The pre-ducted optical fiber cable assembly as claimed in claim 1, further comprising an armoring layer enclosing the duct.

8. The pre-ducted optical fiber cable assembly as claimed in claim 7, wherein the armoring layer is made of a material selected from a group consisting of steel tape, aramid yarns, glass yarns, fiber reinforced plastic, and steel wire.

* * * * *